(12) United States Patent
Strecker et al.

(10) Patent No.: US 8,923,202 B2
(45) Date of Patent: Dec. 30, 2014

(54) COMMUNICATION NETWORK FOR AN ATHLETIC ACTIVITY MONITORING SYSTEM

(75) Inventors: Markus Strecker, Landenberg, PA (US); Paul Nickelsberg, Concord, MA (US)

(73) Assignee: adidas AG, Herzogenauragh (DE)

( * ) Notice: Subject to any disclaimer, the term of this patent is extended or adjusted under 35 U.S.C. 154(b) by 283 days.

(21) Appl. No.: 13/555,738

(22) Filed: Jul. 23, 2012

(65) Prior Publication Data

US 2014/0023049 A1 Jan. 23, 2014

(51) Int. Cl.
*A63B 24/00* (2006.01)

(52) U.S. Cl.
USPC .......................................................... 370/328

(58) Field of Classification Search
None
See application file for complete search history.

(56) References Cited

U.S. PATENT DOCUMENTS

| | | | |
|---|---|---|---|
| 6,616,606 B1 * | 9/2003 | Petersen et al. ............... | 600/300 |
| 7,053,770 B2 | 5/2006 | Ratiu et al. | |
| 7,171,451 B2 | 1/2007 | Defosse | |
| 7,181,501 B2 | 2/2007 | Defossé | |
| 7,609,644 B2 | 10/2009 | Tateson | |
| 7,689,164 B2 | 3/2010 | Nishio et al. | |
| 8,277,377 B2 * | 10/2012 | Quy .............................. | 600/300 |
| 8,533,620 B2 * | 9/2013 | Hoffman et al. .............. | 715/772 |
| 8,684,923 B2 * | 4/2014 | Craine et al. .................. | 600/301 |
| 2002/0035554 A1 | 3/2002 | Katsuno et al. | |
| 2002/0194387 A1 | 12/2002 | Defosse | |
| 2003/0072306 A1 | 4/2003 | Hunzinger | |
| 2003/0174049 A1 * | 9/2003 | Beigel et al. ................ | 340/10.42 |
| 2004/0218528 A1 | 11/2004 | Shipman | |
| 2006/0056331 A1 | 3/2006 | Ratiu et al. | |
| 2006/0056423 A1 | 3/2006 | Ratiu et al. | |
| 2006/0056456 A1 | 3/2006 | Ratiu et al. | |
| 2006/0105709 A1 | 5/2006 | Oh et al. | |
| 2006/0198337 A1 * | 9/2006 | Hoang et al. .................. | 370/329 |
| 2006/0206857 A1 | 9/2006 | Liu et al. | |
| 2006/0245440 A1 * | 11/2006 | Mizukoshi .................... | 370/400 |
| 2007/0121531 A1 | 5/2007 | Lee et al. | |
| 2007/0206500 A1 | 9/2007 | Mollah et al. | |
| 2007/0206628 A1 | 9/2007 | Nishio et al. | |
| 2008/0088436 A1 * | 4/2008 | Reeves et al. ............. | 340/539.12 |
| 2008/0151810 A1 | 6/2008 | Watanabe et al. | |
| 2009/0081951 A1 * | 3/2009 | Erdmann et al. ............. | 455/41.2 |
| 2009/0238133 A1 * | 9/2009 | Sakoda ......................... | 370/329 |
| 2012/0092155 A1 * | 4/2012 | Abedi ....................... | 340/539.12 |
| 2012/0253484 A1 * | 10/2012 | Burich et al. .................... | 700/91 |
| 2012/0254934 A1 * | 10/2012 | McBrearty et al. ........... | 725/118 |
| 2013/0041590 A1 * | 2/2013 | Burich et al. .................. | 702/19 |
| 2013/0282589 A1 * | 10/2013 | Shoup et al. .................... | 705/67 |

* cited by examiner

*Primary Examiner* — Kerri Rose
(74) *Attorney, Agent, or Firm* — Sterne, Kessler, Goldstein & Fox P.L.L.C.

(57) ABSTRACT

The present invention provides a communication network for facilitating monitoring of an athletic activity. In one exemplary embodiment, such a communication network includes a base station and a first monitor configured to be coupled to an individual, wherein the base station is configured to transmit a first beacon message, wherein, in response to receipt of the first beacon message, the first monitor is configured to transmit an endpoint message including a characteristic of the individual, and wherein the base station is configured to receive the endpoint message, and, if the base station does not receive the endpoint message by a determined time, the base station is configured to transmit a second beacon signal, the second beacon signal including instructions to a second monitor to transmit the endpoint message (i.e., the same endpoint message transmitted by the first monitor).

21 Claims, 6 Drawing Sheets

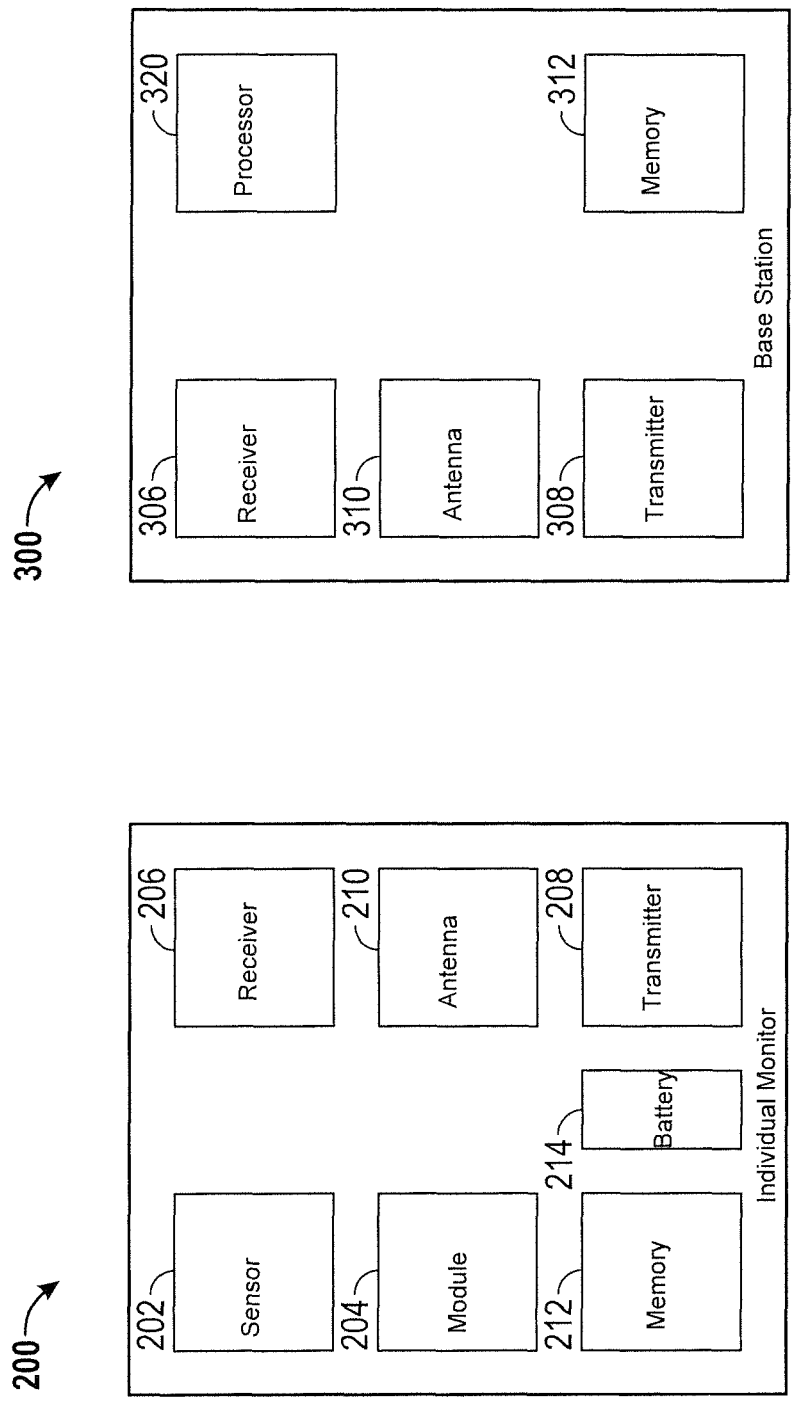

COMMUNICATION NETWORK FOR AN ATHLETIC ACTIVITY MONITORING SYSTEM

BACKGROUND OF THE INVENTION

1. Field of the Invention

The present invention generally relates to communication networks, and in particular to a communication network for an athletic activity monitoring system.

2. Background Art

Exercise is important to maintaining a healthy lifestyle and individual well-being. A common way for individuals to exercise is to participate in athletic activities, such as, for example, sports and training programs. A session of athletic activity may include, for example, a training session or a competitive session such as, for example, a soccer match or basketball game. When participating in athletic activities in a competitive or collaborative environment, one's performance may be dependent on the performance of other individuals. For example, in a team sport context, the performance of various athletic movements and endeavors may be influenced by the athletic movements and endeavors of teammates or adversaries. Often, a trainer (e.g., a coach) is monitoring such athletic activity.

BRIEF SUMMARY OF THE INVENTION

The present invention allows a trainer or coach to electronically monitor physiological and performance characteristics of an individual athlete even when that individual athlete is out of range for direct electronic communication with electronic monitoring equipment providing information to the trainer.

The present invention provides a communication network for monitoring an athletic activity. In one aspect of the invention, a communication network for facilitating monitoring of an athletic activity includes a base station and a first monitor configured to be coupled to an individual, wherein the base station is configured to transmit a first beacon message, wherein, in response to receipt of the first beacon message, the first monitor is configured to transmit an endpoint message including a characteristic of the individual, and wherein the base station is configured to receive the endpoint message, and, if the base station does not receive the endpoint message by a determined time, the base station is configured to transmit a second beacon signal, the second beacon signal including instructions to a second monitor to transmit the endpoint message (i.e., the same endpoint message transmitted by the first monitor).

In another aspect of the invention, a communication network for facilitating monitoring of an athletic activity includes a base station, a first monitor configured to be coupled to a first individual, and a second monitor configured to be coupled to a second individual, wherein the base station is configured to transmit a first beacon signal during a first frame, wherein, in response to receipt of the first beacon signal, the first monitor is configured to transmit first data representing first characteristics of the first individual during the first frame, wherein, in response to receipt of the first beacon signal, the second monitor is configured to transmit second data representing second characteristics of the second individual during the first frame, wherein the first monitor is configured to receive the second data, wherein the base station is configured to receive the first data and the second data during the first frame, and, if the base station does not receive the second data during the first frame, the base station is configured to transmit a second beacon signal during a second frame, the second beacon signal including instructions to the first monitor to transmit the second data during the second frame, and wherein, in response to receipt of the second beacon signal, the first monitor is configured to transmit the second data during the second frame.

In another aspect of the invention, a communication network for facilitating monitoring of an athletic activity includes a base station, a first monitor configured to be coupled to a first individual, and a second monitor configured to be coupled to a second individual, wherein the base station is configured to transmit a first beacon message, wherein, in response to receipt of the first beacon message, the first monitor is configured to transmit an endpoint message including data relating to characteristics of the first individual, wherein the second monitor is configured to receive the endpoint message from the first monitor, wherein, in response to not receiving the endpoint message from the first monitor by a determined time, the base station is configured to transmit a second beacon message instructing the second monitor to transmit the endpoint message, and wherein, in response to receipt of the second beacon message, the second monitor is configured to transmit the endpoint message.

In another aspect of the invention, a monitor for monitoring athletic activity includes a sensor configured to determine first data representing a first characteristic of a first individual, a receiver configured to receive second data representing a second characteristic of a second individual, and a transmitter configured to transmit the first data and the second data to a base station.

In another aspect of the invention, a method for monitoring athletic activity includes transmitting, via a base station, a first beacon message, transmitting, via a first monitor in response to receipt of the first beacon message by the first monitor, an endpoint message including data indicative of a characteristic of an individual, storing the endpoint message at the base station, if the endpoint message transmitted by the first monitor is received by the base station, receiving, at a second monitor, the endpoint message transmitted by the first monitor, transmitting, via the base station, a second beacon message, including instructions for the second monitor to transmit the endpoint message, if the endpoint message transmitted by the first monitor is not received by the base station by a determined time, transmitting, via the second monitor in response to receipt of the second beacon message, the endpoint message, and storing the endpoint message at the base station, if the endpoint message transmitted by the second monitor is received by the base station.

BRIEF DESCRIPTION OF THE FIGURES

The accompanying drawings, which are incorporated herein and form a part of the specification, illustrate the present invention and, together with the description, further serve to explain the principles of the invention and to enable a person skilled in the pertinent art to make and use the invention. In the drawings, like reference characters indicate identical or functionally similar elements.

FIG. 4 depicts an individual monitor according to an exemplary embodiment of the present invention.

FIG. 5 depicts a base station according to an exemplary embodiment of the present invention.

DETAILED DESCRIPTION OF THE INVENTION

Figure 1:
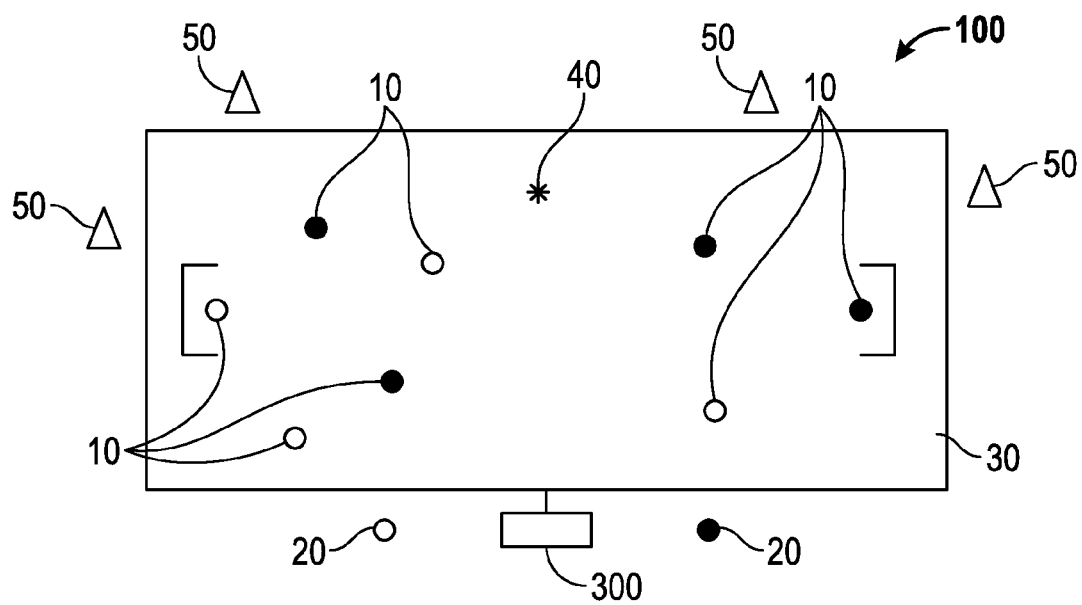
FIG. 1 depicts a communication network according to an exemplary embodiment of the present invention.

The present invention will now be described in detail with reference to embodiments thereof as illustrated in the accompanying drawings. References to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "invention" or "present invention" as used herein is a non-limiting term and is not intended to refer to any single embodiment of the particular invention but encompasses all possible embodiments as described in the application.

Various aspects of the present invention, or any parts or functions thereof, may be implemented using hardware, software, firmware, tangible computer readable or computer usable storage media having instructions stored thereon, or a combination thereof, and may be implemented in one or more computer systems or other processing systems.

Individuals participating in an athletic activity and trainers (e.g., a coach, physician, or other authorized individual) may work together during a session of athletic activity for a variety of reasons. For example, it may be desired that the trainer monitors the performance of the individuals and makes recommendations or otherwise influences their performance in order to maximize the individuals' fitness level. Alternatively or additionally, it may be desired that the trainer monitors and influences the individuals to help maximize the effectiveness of the individuals in the athletic activity. Further, it may be desired that the trainer monitors and influences the individuals to help maximize the probability of success in the athletic activity (where success may be, for example, defeating an opposing team in a game, such as, for example, soccer, football, or basketball, or achieving/maintaining a desired level of fitness for one or more individuals participating in the athletic activity). A session of athletic activity may include, for example, a training session (e.g., a field session, a gym session, a track session) or a competitive session (e.g., a soccer match or a basketball game).

In some exemplary embodiments, the trainer may monitor and influence the individuals in order to track and maintain the individuals' health and safety. In such an embodiment, it may be beneficial for the trainer to be provided with information relating to health and safety, for example, injuries, illnesses, and dangerous conditions.

The trainer must consider these and other goals, monitor the individuals, and make decisions to influence the performance of the individuals both individually and as a group. In doing so, the trainer depends on information about the individuals and their performance while participating in a session of athletic activity.

To effectively monitor the athletic activity, the trainer, or other individual, typically gathers information about the participants in the athletic activity by viewing the athletic activity from, for example, the sidelines of a sports field. Thus, the information used to make decisions that influence the athletic activity may be limited by what is observed by the trainer from the sidelines. A trainer may have assistants to help with this observation, or multiple trainers may work together, however there remains difficulty in monitoring a plurality of individuals so as to effectively track and manage performance of individuals during an athletic activity.

Further, there may be times when an athlete is out of visual range of a trainer. In circumstances in which the athlete is being monitored by electronic monitoring equipment, there may be times when the athlete is out of range of the electronic monitoring equipment. Such electronic monitoring equipment may include, for example, equipment including suitable sensors for monitoring parameters such as an athlete's heart rate, breath rate, acceleration, speed, or distance. In some embodiments, such electronic monitoring equipment may include the equipment disclosed, for example, in one or more of U.S. patent application Ser. No. 13/077,494, filed Mar. 31, 2011, titled "Group Performance Monitoring System and Method"; U.S. patent application Ser. No. 13/077,520, filed Mar. 31, 2011, titled "Sensor Garment"; U.S. patent application Ser. No. 13/077,510, filed Mar. 31, 2011, titled "Group Performance Monitoring System and Method"; U.S. patent application Ser. No. 13/446,937, filed Apr. 13, 2012, titled "Athletic Activity Monitoring Methods and Systems"; U.S. patent application Ser. No. 13/446,982, filed Apr. 13, 2012, titled "Sport Ball Athletic Activity Monitoring Methods and Systems"; U.S. patent application Ser. No. 13/446,986, filed Apr. 13, 2012, titled "Wearable Athletic Activity Monitoring Methods and Systems"; and U.S. patent application Ser. No. 13/543,428, filed Jul. 6, 2012, titled "Group Performance Monitoring System and Method", of which the disclosure of each is incorporated herein by reference thereto in its entirety.

Where the athlete and/or electronic monitoring equipment are out of range, it may be beneficial to extend the effective reach of such electronic monitoring equipment to minimize data loss due to range and signal limitations of such electronic monitoring equipment.

The trainer may benefit from receipt of information in addition to that which is directly observable by the trainer. A group monitoring system can provide the trainer with easy-to-understand information about individuals participating in the athletic activity, beyond that which can be directly observed, thereby facilitating quick and effective decision-making by the trainer to maximize the probability of achieving success in the athletic activity.

Figure 2A:
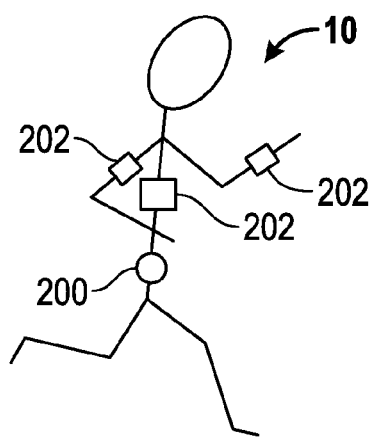
FIG. 2A depicts an individual wearing an individual monitor according to an exemplary embodiment of the present invention.
Figure 2B:
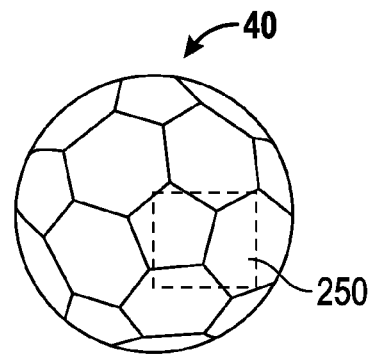
FIG. 2B depicts an object including an object monitor according to an exemplary embodiment of the present invention.
Figure 3:
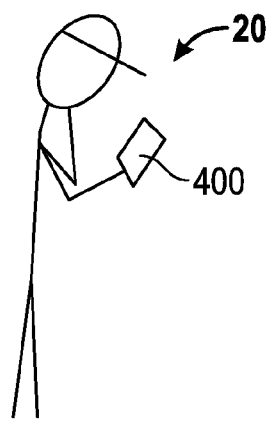
FIG. 3 depicts a trainer using a group monitoring device according to an exemplary embodiment of the present invention.
Figures 6, 7:
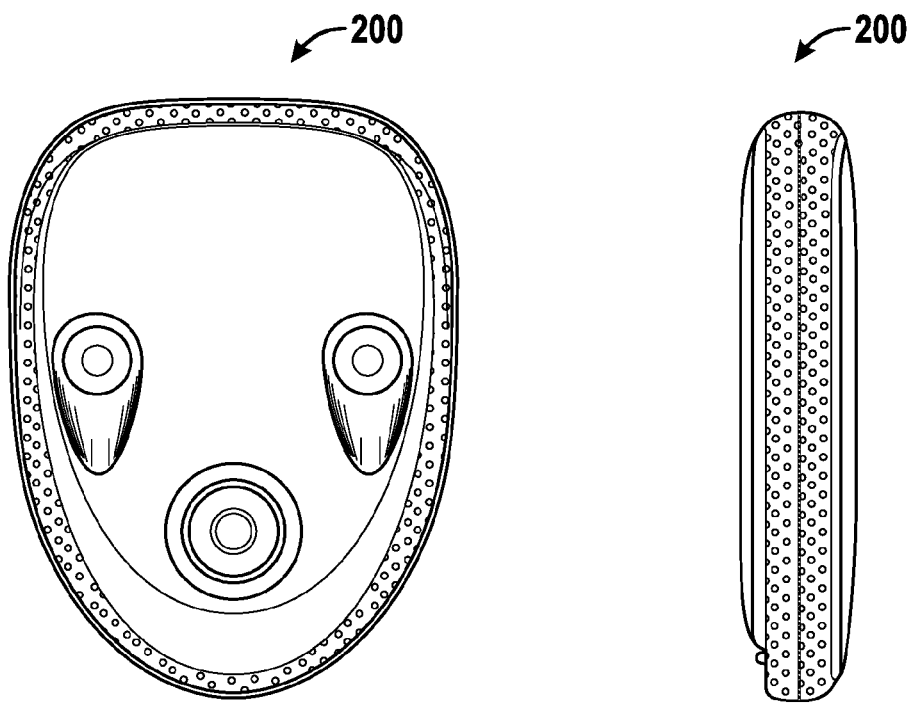
FIG. 6 depicts an individual monitor according to an exemplary embodiment of the present invention.
FIG. 7 depicts an individual monitor according to an exemplary embodiment of the present invention.
Figure 8:
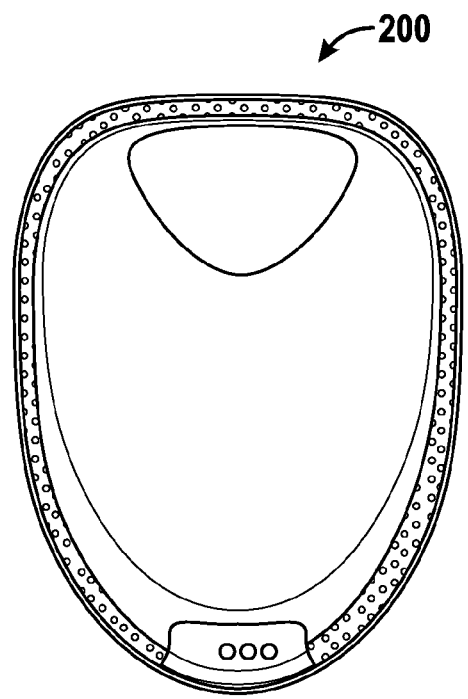
FIG. 8 depicts an individual monitor according to an exemplary embodiment of the present invention.

In an exemplary embodiment, group monitoring system 100, depicted in, for example, FIGS. 1-3, includes individual monitors 200, object monitors 250, a base station 300, and at least one group monitoring device 400. Each individual monitor 200 may be coupled to an individual 10 (e.g., worn or carried by the individual 10), as shown in FIG. 2. Each object monitor 200 may be coupled to a sports object 40, as shown for example in FIG. 2B. Each monitor 200, 250 may include or be in communication with a variety of sensors 202 configured to monitor parameters of the individual 10 or sports object 40. Such sensors may include, but are not limited to, a location sensor (e.g., GPS receiver), an accelerometer, a magnetic field sensor, a pedometer, a heart rate monitor, a position sensor, an impact sensor, a camera, a magnetometer, a gyroscope, a microphone, a temperature sensor, and a wind sensor. For simplicity, monitors 200, 250 will be generally described throughout the specification with reference to individual monitors 200, and individuals 10 and objects 40 will be generally described with reference to individuals 10. It should be understood, however, that the description of individual monitors 200 and individuals 10 may generally apply to object monitors 250 and objects 40 as well.

Generally, sensors 202 are mounted to individuals 10 in preparation for participation by individuals 10 in a session of athletic activity. Sensors 202 mounted to a particular individual 10 are coupled, either via wires or wirelessly, to an individual monitor 200, also mounted on the particular individual 10. Sensors 202 may be integrated within the housing of an individual monitor 200, or may be separate or remote therefrom. Sensors 202 sense characteristics about the particular individual 10 during participation by the particular individual 10 in the session of athletic activity, and transmit data indicative of the characteristics to individual monitor 200. Multiple individual monitors 200 may operate similarly, and each individual monitor 200 may in turn transmit its data to base station 300 during the session of athletic activity. Thus, base station 300 and individual monitors 200 together form a communication network.

In some exemplary embodiments, such transmissions occur in real time. "Real time" as used herein may include delays inherent to transmission technology, delays designed to optimize resources, and other inherent or desirable delays that would be apparent to one of skill in the art. In some exemplary embodiments, such transmission is delayed from real time, or may occur after completion of the activity. Base station 300 receives the data from individual monitors 200 and determines metrics from the data, where the metrics may be representations of the characteristics measured by sensors 202, or may be representations of further characteristics derived from the data through the use of algorithms and other data manipulation techniques. Base station 300 in turn transmits the metrics during the session of athletic activity to group monitoring device 400, which receives the metrics and displays a representation of the metrics.

Group monitoring device 400 may receive metrics associated with a plurality of individuals 10, and may display the received metrics in association with the individual 10 with which they are associated. In this way, trainer 20 viewing group monitoring device 400 during the session of athletic activity receives detailed information about multiple individuals 10, and can act on that information as it is determined necessary or expedient, thereby efficiently monitoring and managing individuals 10 during the session of athletic activity.

In an exemplary embodiment, as shown in FIGS. 4 and 6-8, individual monitor 200 includes a sensor 202, and a module 204. Modules 204 may communicate with internal sensors 202 positioned within individual monitor 200 or with external sensors 202 positioned outside of individual monitor 200 (e.g., positioned elsewhere on the body of individual 10). Individual monitor 200 may include any number of sensors 202 and modules 204. Sensors 202 sense characteristics relating to the individual associated with individual monitor 200, and individual monitor 200 stores data indicative of the characteristics in a memory 212.

Each individual monitor 200 may also include a receiver 206, a transmitter 208, an antenna 210, and a battery 214. Receiver 206, transmitter 208, and antenna 210 may facilitate communication between individual monitor 200 and base station 300, or between one individual monitor 200 and another individual monitor 200. Such communication can include messages providing data relating to an associated individual 10. Receiver 206 may listen for and receive messages wirelessly via antenna 210, and transmitter 208 may transmit messages wirelessly via antenna 210. In an exemplary embodiment, receiver 206 and transmitter 208 may be replaced by a transceiver, which performs the functions of both receiver 206 and transmitter 208. Messages received by individual monitor 200 may be stored in memory 212 of individual monitor 200. Battery 214 may provide power to components of individual monitor 200, and may be exchangeable and/or rechargeable. Antenna 210 may be integrated within a housing of individual monitor 200, or may be remote from and connected to individual monitor. For example, antenna 210 may be integrated within a garment of an associated monitored individual 10, and may be communicatively linked to individual monitor 200 by a wire (or, in some embodiments, wirelessly). In this way, an antenna size is not limited by the size of individual monitor 200.

Figure 9:
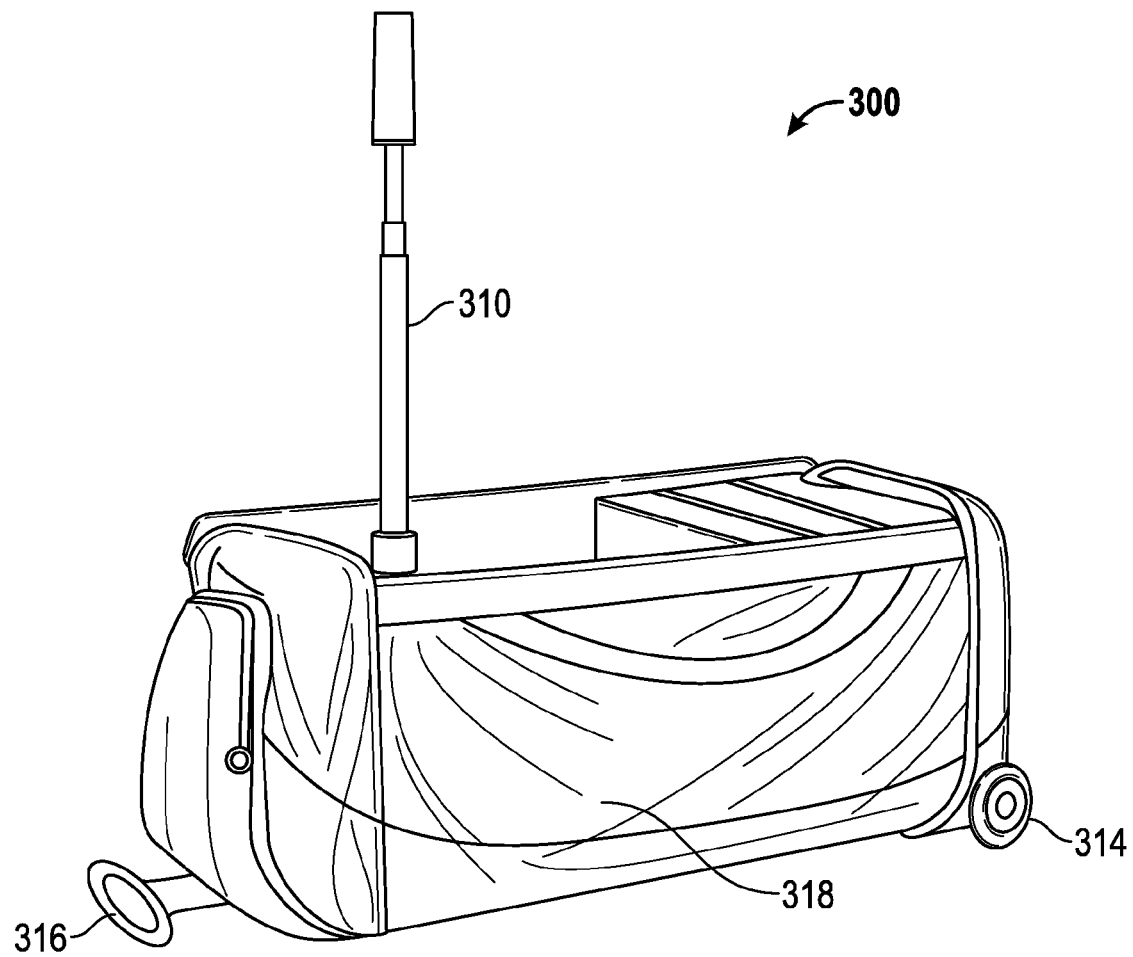
FIG. 9 depicts a base station according to an exemplary embodiment of the present invention.

In an exemplary embodiment, as shown in FIGS. 5 and 9, base station 300 includes a receiver 306, a transmitter 308, an antenna 310, and a memory 312. Receiver 306, transmitter 308, and antenna 310 may facilitate communication between base station 300 and individual monitors 200. Receiver 306 may listen for and receive messages wirelessly via antenna 310, and transmitter 308 may transmit messages wirelessly via antenna 310. In an exemplary embodiment, receiver 306 and transmitter 308 may be replaced by a transceiver, which can perform the functions of both receiver 306 and transmitter 308. Messages received by base station 300 may be stored in memory 312 of base station 300.

Base station 300 may transmit and receive messages from individual monitors 200 via antenna 310 configured for one or more of RF communication, WLAN communication, ISM (e.g., 2.45 GHz ISM radio band) communication, cellular (e.g., GSM broad band 2.5G or 3G) communication, other suitable communication, or a combination thereof. Communication among base station 300 and individual monitors 200 may be bi-directional. In other words, in some embodiments individual monitors 200 and base station 300 may both receive data (e.g., listen for and accept messages from, for example, base station 300 or other individual monitors 200) and transmit data (e.g., send messages to, for example, base station 300 or other individual monitors 200. Communication among base station 300 and individual monitors 200 may be formatted as, for example IEEE 802.15.4 radio messages. Antenna 310 may be a high-gain antenna, and in some exemplary embodiments base station 300 includes multiple (e.g., 2) such antennas 310. Once the data is received, base station 300 can store such data in memory 312, and can determine metrics from the data using a processor 320.

Each individual monitor 200 is portable with respect to base station 300 and can be carried by an individual 10 participating in an athletic activity. Individual monitor 200 may itself include sensors 202, and/or may be in wired or wireless communication with sensors 202 carried by individual 10 and located remotely from individual monitor 200. Each individual monitor 200 can be paired with base station 300 and associated with an individual 10. Each individual monitor 200 may include a unique identifier. The unique identifier may be electronically stored within individual monitor and evidenced by, for example, a number imprinted on a viewable surface of individual monitor 200, or data communicated or displayed when a button is pressed on individual monitor 200 or when a request signal is received from base station 300.

Base station 300 may be a self-contained portable system, such as the exemplary embodiments depicted in FIG. 9, containing all hardware required or desired to perform the functions of base station 300 described herein. In some exemplary embodiments, base station 300 weighs no more than 25 kilograms. In some exemplary embodiments, base station 300 is sized so as to fit easily into the trunk of a car or the overhead storage area of a passenger aircraft. In some exemplary embodiments, base station 300 includes a pair of wheels 314 at one end, and a handle 316 at the other end, to facilitate mobility of base station 300. In some exemplary embodiments, base station 300 is waterproof, and can withstand impacts associated with regular use and transport. In some exemplary embodiments, base station 300 is contained within a hard shell-style case. In some exemplary embodiments, base station 300 is contained within a soft duffel bag-style case 318.

Individual monitor 200 can be paired with base station 300 in a variety of ways, for example, by connecting to base station 300 via a docking port, or by utilizing a wireless pairing protocol. To be paired with base station 300, base station 300 may record the unique identifier of an individual monitor 200 and may assign a unique encryption key to the individual monitor 200. This encryption key can be used to support secure transmission of data during the session of athletic activity. Such secure transmission of data may be, for example, from individual monitors 200 to base station 300, from base station 300 to individual monitors 200, and from one individual monitor 200 to one or more other individual monitors 200. The encryption key can be renewed when required or desired (e.g., at the beginning of each new session of athletic activity).

Via an administrative interface of base station 300, identification information of individual 10 (e.g., individual 10's name and/or jersey number) can be associated with the unique identifier of the individual monitor 200 to be carried by individual 10.

During a session of athletic activity, base station 300, acting as a network coordinator, and individual monitors 200, acting as network endpoints, may communicate to facilitate transmission of messages including sensed data relating to each monitored individual 10 to base station 300 at periodic intervals. Base station 300 can store the received data for access by trainer 20 in real time during the session of athletic activity, for review and analysis after the session of athletic activity, or for any other reason. Together, base station 300 and individual monitors 200 establish a wireless communication network for an athletic activity monitoring system. In an exemplary embodiment, this communication network operates in the 2.45 GHz ISM radio band according to a timeslot-based IEEE 802.15.4-style protocol. As would be appreciated by one of skill in the art, the present invention may be practiced in accordance with other network parameters and protocols as well.

Figure 10:
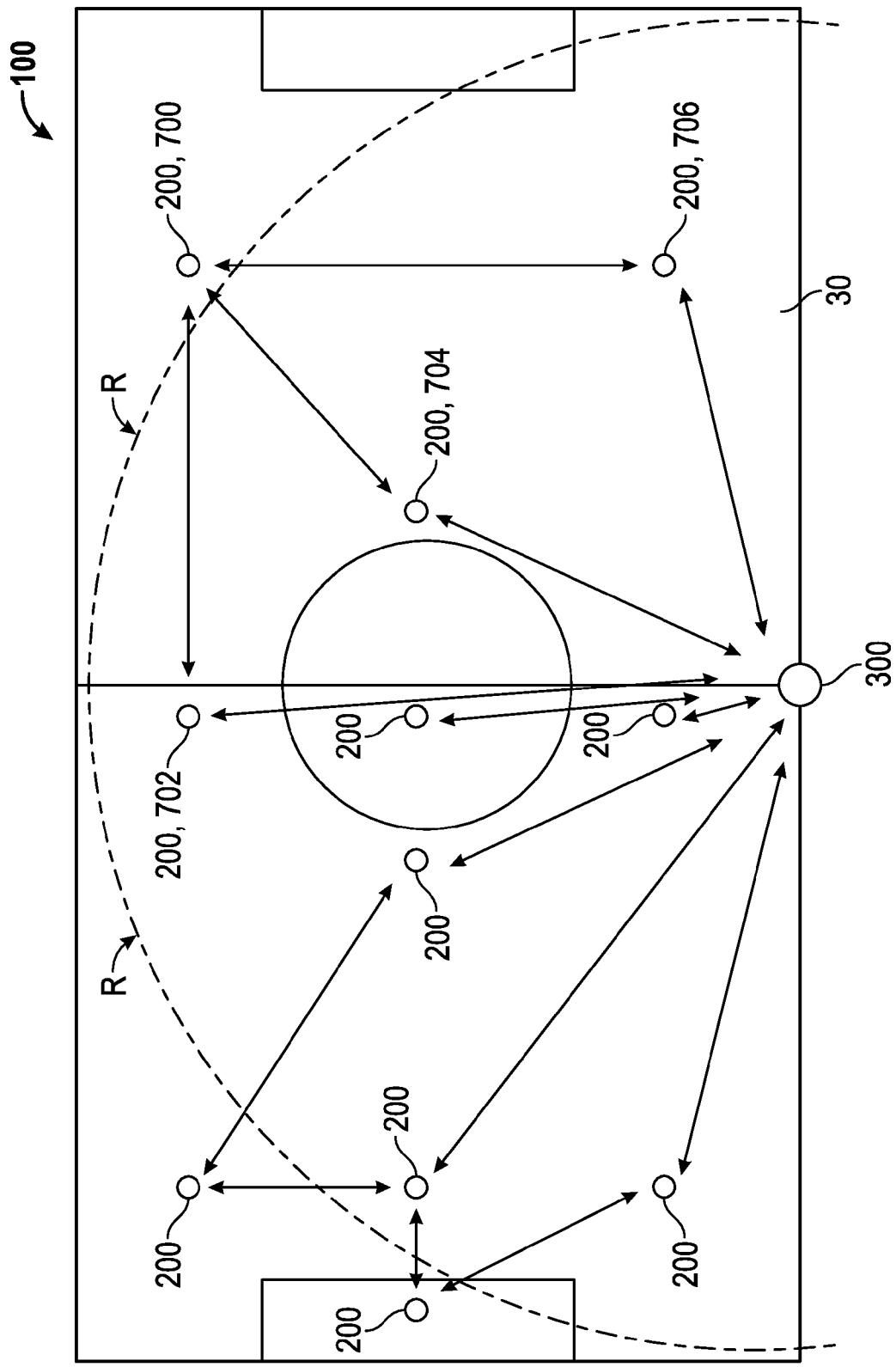
FIG. 10 depicts a communication network according to an exemplary embodiment of the present invention.

With reference to FIG. 10, a reception range R of base station 300 indicates the range of reception of base station 300. During an initial transmit time period, each individual monitor 200 transmits a message to base station 300. Those individual monitors 200 that are positioned outside range R may not have their messages received by base station 300 directly. Messages sent by those individual monitors 200 that are outside range R, however, may be received by one or more other individual monitors 200, one or more of which may be positioned within range R. During a repeat time period, individual monitors 200 that have been instructed to by base station 300 will transmit the message previously received from an individual monitor 200 that was outside range R. Base station 300, upon receipt of the messages sent during the repeat time period, may use those messages to fill gaps in its stored message set(s) that resulted from failing to receive the initial transmissions of the messages during the initial transmit time period. Thus, base station 300 may be able to obtain a substantially complete message set. In this way, the communication network can dynamically respond to rapidly changing network conditions, such as, for example, individual monitors moving in and out of range R. It should be understood that such communication between monitors as described is not limited to communication between individual monitors 200, but can occur between one or more first individual monitors 200 and one or more second individual monitors 200, between one or more first object monitors 250 and one or more second object monitors 250, or between a one or more object monitors 250 and one or more individual monitors 200.

As noted above, where an individual monitor 200 is out of range R of base station 300, its messages can be transmitted to base station 300 dynamically, via other individual monitors 200 or repeater devices 50. In some embodiments, base station 300 monitors the signal strength or location of each individual monitor 200. In cases where an individual monitor is determined to be likely to move out of range R (e.g., by determining that its signal strength has dropped below a threshold strength, or that its position is within a threshold distance of the edge of a range of base station 200), base station 300 may transmit instructions to other individual monitors 200 (or repeater devices) to listen for, receive, store, and transmit to base station 300 messages and other transmissions from the individual monitor 200 determined to be likely to move out of range. In some embodiments, such instructions may be transmitted only to a number of individual monitors 200 closest to the individual monitor 200 determined to be likely to move out of range, or the individual monitors 200 within a threshold range of the individual monitor 200 determined to be likely to move out of range, or to all individual monitors 200. In this way, arrangements for retransmission of data from an individual monitor 200 out of range of base station 300 can be established in advance of the individual monitor 200 actually going out of range. Such advance arrangement can help to streamline data flow and promote data integrity.

In some embodiments, a first individual monitor 200 outside range R transmits a message. The message is received by a second individual monitor inside range R, which transmits the message to base station 300, as described above. Group monitoring system 100, however, is not limited to such 2-step transmission. In some embodiments, data is transmitted from first individual monitor 200 to base station 300 in three or more steps. For example, first individual monitor 200 outside range R transmits a message. The message is received by second individual monitor 200 outside range R, which transmits the message. The message is received by a third individual monitor 200 inside range R, which transmits the message to base station 300. Such transmission between individual monitors 200 outside range R can continue in as many steps as necessary until the message is received by an individual monitor within range R, which transmits the message to base station 300. In some embodiments intermediate individual monitors in the transmission path (e.g., second individual monitor 200) can transmit the message originating from the first individual monitor 200 along with its own message (e.g., a message originating from the second individual monitor 200). Such a transmission path can be established automatically among individual monitors 200, or can be directed by base station 300 (which may include information as to the location of each individual monitor 200).

Figure 11:
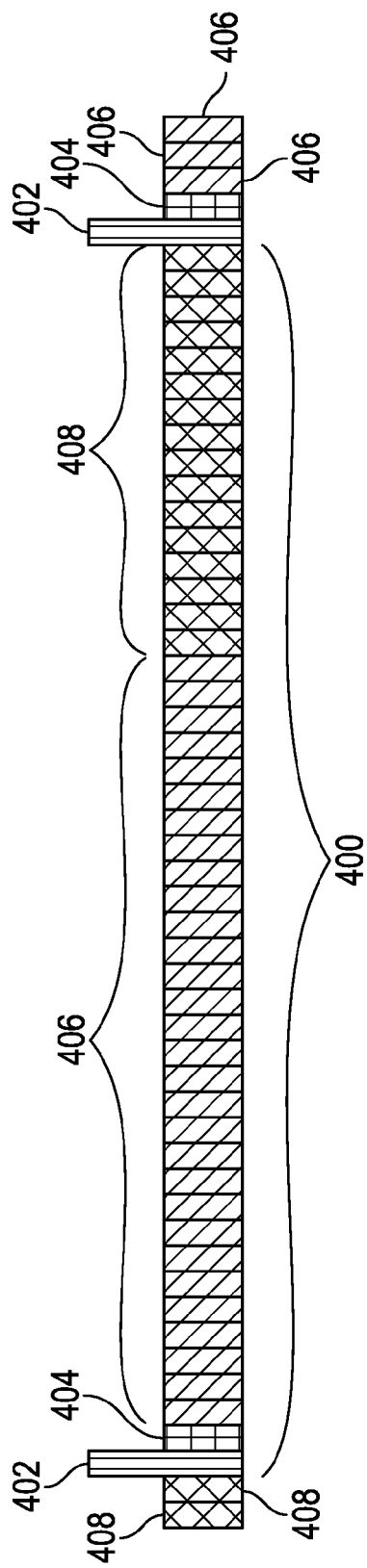
FIG. 11 depicts a network frame according to an exemplary embodiment of the present invention.

More specifically, during a session of athletic activity, base station 300 may communicate with individual monitors 200 in accordance with a communication protocol. For example, communication may take place according to a network frame format, such as, for example, that represented in FIG. 11, in which a network frame 400 includes a number of timeslots 402, 404, 406, 408 for communication. A network frame 400 may include, for example, 48 timeslots.

The first timeslot in a network frame may be a beacon message time slot 402, the second timeslot may be a sub-channel message timeslot 404, the next 30 timeslots may be endpoint message timeslots 406, and the next 16 timeslots may be repeat message timeslots 408.

Beacon messages may be transmitted by base station 300 during beacon message timeslots 402. In some exemplary embodiments, beacon messages are transmitted precisely at strictly defined times. Individual monitors 200 may receive and synchronize to the beacon message, so that network frames and the timeslots therein occur according to the same schedule for base station 300 and individual monitors 200.

Sub-channel messages may be transmitted by base station 300 during sub-channel message timeslots 404. Sub-channel messages transmit network timeslot information to individual monitors 200, thereby communicating to each individual monitor 200 during which of the 30 endpoint message timeslots 406 it is to transmit its data. In some embodiments, a single sub-channel message assigns timeslots for all individual monitors 200 (i.e., each of multiple individual monitors 200 receives its own timeslot assignment from the same combined assignment message such that assignment occurs simultaneously throughout multiple individual monitors 200 based on the same message). In some embodiments, a single sub-channel message assigns a timeslot for a single individual monitor 200 (i.e., timeslot assignment occurs sequentially for multiple monitors—one at a time, with each individual monitor receiving a monitor-specific assignment message). In the case where base station 300 is being used to monitor 30 individual monitors 200, each individual monitor 200 may be assigned to transmit data to base station 300 at a particular one of the 30 endpoint message time slots 406. An endpoint message timeslot assignment may be maintained indefinitely across multiple frames (e.g., a subject individual monitor 200 is assigned to transmit its endpoint message at the third endpoint message timeslot of each frame). An endpoint message timeslot assignment can be changed via another sub-channel message including a new endpoint message timeslot assignment.

Endpoint messages may be transmitted by individual monitors 200, each during its assigned endpoint message timeslot 406. An endpoint message transmitted by a first individual monitor 200 may include data relating to the individual 10 associated with the first individual monitor 200 (e.g., sensed characteristics of individual 10, initial data gathered or data gathered since its last transmission), as well as data identifying which endpoint messages transmitted by other individual monitors 200 have been received and stored by the first individual monitor 200 during one or more prior frames. Each individual monitor 200 transmits an endpoint message once per network frame during its assigned endpoint message timeslot 406. Endpoint messages can be received and stored by base station 300 (e.g., in memory 312 of base station 300) and by other individual monitors 200 (e.g., in memory 212 of individual monitor 200).

Beacon messages may also include repeat instructions for a first individual monitor 200 to retransmit an endpoint message received by the first individual monitor 200 from a second individual monitor 200. A beacon message may include such instructions, for example, in the event that base station 300 did not receive an expected endpoint message within a determined time (e.g., during a particular frame, during a particular timeslot, within a time period measured from the particular frame or timeslot) or received an incomplete or corrupt endpoint message from the second individual monitor 200 for a prior frame, and has thus stored an incomplete message set for the prior frame (e.g., a message set with one or more gaps due at least in part to not receiving the endpoint message from the second individual monitor 200 during the prior frame). Base station 300 may not have received the expected endpoint message or may have received an incomplete or corrupt endpoint message for a variety of reasons, for example, because the second individual monitor was outside the reception range of base station 300, because an obstacle was interposed between base station 300 and the second individual monitor 200, or because of signal interference.

Repeat instructions of a beacon message may include the unique identifier of the individual monitor that should retransmit an endpoint message received from another individual monitor 200, an identification of the message to be retransmitted (e.g., a unique message number), and the repeat message timeslot 408 in which to perform the retransmission. For example, if a beacon message includes instructions for a first individual monitor 200 to retransmit the endpoint message received by the first individual monitor 200 from the second individual monitor 200, the beacon message will assign a repeat message timeslot 408 to the first individual monitor 200 for the repeat transmission. During the assigned repeat message timeslot 408, the first individual monitor 200 will transmit the endpoint message received from the second individual monitor 200. Transmission of an endpoint message transmitted directly from the individual monitor 200 at which it originated may be referred to as an initial transmission, and subsequent retransmission of this endpoint message by other individual monitors 200 at which it did not originate may be referred to as repeat transmissions. Upon receipt of the endpoint message via the repeat transmission, base station 300 can update a prior frame's stored message set with the information contained in the endpoint message in order to render the message set more complete.

During a session of athletic activity, individuals 10 carrying individual monitors 200 may change position. For example, individuals 10 may run the expanse of playing field 30, and may even run beyond the bounds of playing field 30. Base station 300 may have a limited reception range R—it may receive transmissions from individual monitors 200 within range R, and may not receive transmissions from individual monitors 200 outside of range R (see, e.g., FIG. 10). In changing position, some individuals 10 may be positioned outside of range R of base station 300. During a given network frame 400, an individual monitor 200 may be within or outside of range R during its assigned endpoint message timeslot 406. During its assigned endpoint message timeslot 406, individual monitor 200 transmits its endpoint message for the current network frame 400. If individual monitor 200 is within range R when it transmits its endpoint message, the endpoint message will be received by base station 300. If individual monitor 200 is outside of range R when it transmits its endpoint message, the endpoint message may not be received by base station 300.

In the case where all individual monitors 300 are within range R during their respective endpoint message timeslots 406 of a given frame, all endpoint messages for that frame will be received by base station 300, and a complete message set for that frame can be stored in memory 312 of base station 300.

In addition to sending an endpoint message ("primary endpoint message") during its assigned frame, a first individual monitor 200 also "listens" for and receives endpoint messages ("secondary endpoint messages") transmitted by other individual monitors 200 that are within the reception range of the first individual monitor 200. The first individual monitor 200 stores the secondary endpoint messages in its memory 212 for potential subsequent repeat transmission, to take place in the event the first individual monitor 200 is instructed, via a beacon message sent from base station 300, to transmit any or all of the secondary endpoint messages during one or more repeat message timeslots 408 of a subsequent frame. An individual monitor 200 may store all secondary endpoint messages received throughout a session, or may store a defined amount or number of secondary endpoint messages. Limiting the amount or number of secondary endpoint messages stored by an individual monitor 200 may require less resources and improve operating efficiency.

As an example, base station 300 and its range R are depicted in FIG. 10. Individual monitor 700 is outside of range R, and individual monitors 702, 704, 706 are within range R. Individual monitor 700 is within a reception range of each of individual monitors 702, 704, 706. During its assigned endpoint message timeslot 406 in a first frame, individual monitor 700 transmits its endpoint message for the first frame. Because individual monitor 700 is outside of range R, base station 300 cannot receive this message ("missing endpoint message"). Because individual monitor 700 is within the reception range of individual monitors 702, 704, 706, however, each of individual monitors 702, 704, 706 receives and stores the missing endpoint message as a secondary endpoint message. During their assigned timeslots in a second frame following the first frame, each of individual monitors 702, 704, 706 transmit, as part of their primary endpoint messages, data identifying the secondary endpoint messages received and stored. At the beginning of a third frame following the second frame, base station 300 transmits a beacon message instructing one of individual monitors 702, 704, 706 to transmit the missing endpoint message during an assigned repeat message timeslot 408 of the third frame. If, for example, individual monitor 704 is so instructed, then during the assigned repeat message timeslot 408, individual monitor 704 will transmit the missing endpoint message. Upon receipt of the missing endpoint message, base station 300 can update the first frame's stored message set with the information contained in the missing endpoint message in order to render the message set more complete.

If more than one individual monitor 200 indicates that it has received and stored a missing endpoint message (e.g., individual monitors 702, 704, 706), base station 300 may select which individual monitor 200 to instruct to retransmit the missing endpoint message based on any suitable criteria, for example, signal strengths of previous transmissions, or proximity to base station 300 at previous transmissions. In some exemplary embodiments base station 300 may select more than one individual monitor 200 to retransmit the same missing endpoint message.

In the event that base station 300 does not receive a missing endpoint message during a repeat message timeslot 408 as expected, base station may make additional attempts to obtain the missing endpoint message. Such a situation may occur, for example, if an individual monitor 200 that should have been instructed to transmit a missing endpoint message did not properly receive the beacon message including such instructions, or if an individual monitor 200 that has been instructed by base station 300 to transmit a missing endpoint message is outside of range R of base station 300 at the time it has been instructed to transmit the missing endpoint message.

In some embodiments, base station 300 may instruct deletion of data from memories 212 of individual monitors 200. For example, in some embodiments, once a missing endpoint message has been received by base station 300, base station 300 may send a confirmation message indicating that such missing endpoint message has been received. Such a confirmation message may be broadcast to all individual monitors 200 or only to those that have stored the missing endpoint message. In response to receipt of this confirmation message, individual monitors 200 that had stored the missing endpoint message may delete the stored endpoint message. In this way, storage space can be released for re-use, in order to make efficient use of storage capacity in memories 212.

In some embodiments, individual monitors 200 are configured to automatically delete stored data after it has been stored for a period of time. In some embodiments, individual monitors are configured to automatically delete stored data after it has been sent to base station 300 (e.g., after a wired download of such data, or, in some embodiments, after wireless transmission of such data). In some embodiments, individual monitors are configured to delete stored data upon receipt of an indication that data sent to base station 300 has been received and stored by base station 300. In some embodiments, individual monitors 200 are configured to delete the oldest stored data as the amount of stored data approaches the storage capacity of memory 212. For example, when new data stored in memory 212 brings the amount of stored data above a first threshold amount (e.g., 90% of capacity), a sufficient amount of the oldest data stored in memory 212 may be deleted to bring the total amount of stored data below a second threshold amount (which may be the same or different than the first threshold amount).

In an exemplary embodiment, if an individual monitor 200 that has been instructed by base station 300 to transmit a missing endpoint message is outside of range R of base station 300 at the time it has been instructed to transmit the missing endpoint message, its transmission of the missing endpoint message may not be received by base station 300, but may still be received and stored by other individual monitors 200 of which it is within range. When they send their own endpoint messages in a subsequent frame, these other individual monitors 200 will inform base station 300 of the secondary messages received and stored, including the missing endpoint message. Base station 300 may then instruct one or more of these other individual monitors 200, or any other individual monitor 200 that has indicated to base station 300 that it has stored the missing endpoint message, to transmit the missing endpoint message during a subsequent repeat message timeslot 408. This procedure can be repeated until base station 300 has successfully received the missing endpoint message, or until other criteria for terminating the attempt to retrieve the missing endpoint message is met (e.g., a defined number of failed attempts to obtain the missing endpoint message).

Because data stored in base station 300 may be being accessed in real time during a session of athletic activity, missing endpoint messages can lead to gaps in the data being accessed by, for example, trainer 20 using group monitoring device 400. In order to account for these gaps, base station 300 may use placeholder data, which may be interpolated from previously-received data. This placeholder data can be replaced by actual data from the missing endpoint message, if and when it is received.

As described herein, a communication network for an athletic activity monitoring system can dynamically respond to changing network conditions, including the rapid movement of individuals 10 carrying individual monitors 200, including their movement in and out of reception range R of base station 300. Such a communication network as described herein reliably minimizes data loss that may otherwise occur due to a variety of network characteristics, such as, for example, fading and signal loss characteristics, physical size limitations, and available power structure, and can extend the effective reach of base station 300 within the network.

Figure 12:
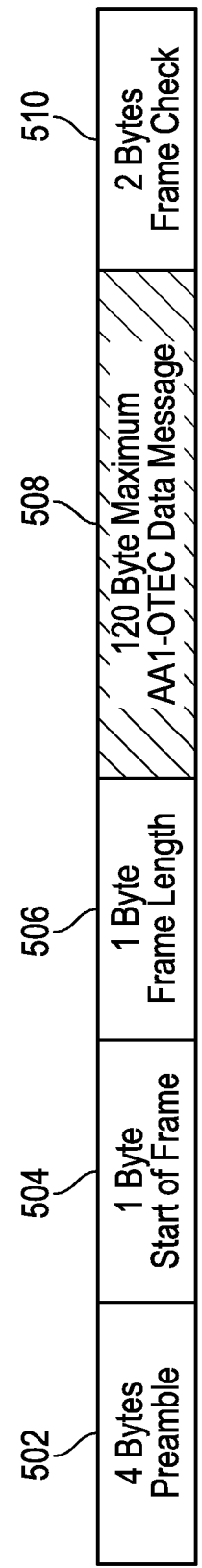
FIG. 12 depicts a message frame format according to an exemplary embodiment of the present invention.

The beacon messages, sub-channel messages, endpoint messages, and repeat messages described herein (collectively "network messages") may be constructed based on any suitable format, including, for example, the IEEE 802.15.4 message format. An exemplary basic IEEE 802.15.4 message frame is depicted in. FIG. 12, and includes a 4 byte preamble 502, a single byte start of frame 504, a single byte frame length 506, a 120 byte maximum data message payload 508, and a 2 byte frame check 510, for a total of a 128 byte message size. Network messages may include or otherwise be identified by unique message identifiers, to facilitate later identification and retrieval of particular network messages. For example, a unique message identifier for a missing endpoint message can be used by base station 300 when identifying missing endpoint messages and communicating instructions for their repeat transmission.

A 128 byte network message may, for example, require approximately 3.93 milliseconds of time for transmission. Each time slot may be, for example, 10 milliseconds in duration. A total of, for example, approximately 2 complete 48-slot frames may be transmitted per second.

Time slots are synchronized across base station 300 and all individual monitors 200 in response to beacon signals transmitted by base station 300. Upon receipt of a beacon message, all individual monitors 200 synchronize themselves thereto, such that each timeslot during the subsequent frame occurs at the same time for all of base station 300 and individual monitors 200. Periodic synchronization can help minimize the effects of timeslot jitter, drifting, or other timing inconsistencies that may occur due to, for example, differently-calibrated internal timers or environmental effects. In some exemplary embodiments, each individual monitor 200 is configured to maintain time slot synchronization to within 500 microseconds of the beacon message, thereby limiting the network's overall timeslot jitter to no more than 500 microseconds.

The communication among base station 300 and individual monitors 200 is described herein to some extent in the context of a single missing endpoint message for a particular frame, for ease of description. As would be appreciated by one of skill in the art, the techniques described herein are applicable to situations including more than one missing endpoint message for more than one frame. During a session of athletic activity, a great number of frames may occur, one after another. Endpoint messages can be transmitted and received and missing endpoint messages can be transmitted and received as described above for frames throughout the session of athletic activity, so as to obtain a substantially complete message set for the entire session of athletic activity.

Additionally, embodiments of the present invention may include repeater devices 50 disposed on or around field 30 (see FIG. 1). Such repeater devices 50 may be in the form of, for example, cones. Repeater devices 50 may be within or without a transmission range of base station 300. A repeater device 50 may receive endpoint messages from individual monitors within range of the repeater device 50, may store such endpoint messages in a memory, and may transmit (i.e., "repeat") such endpoint messages to base station 300 (e.g., automatically or in response to an instruction to do so received from base station 300, as described above for individual monitors 200). Such transmission to base station 300 may be directly from the repeater device 50 to base station 300, or may be via an intermediate individual monitor 200 or another repeater device 50. Such repeater devices 50 can be placed as desired to extend the effective range of base station 300. For example, in some embodiments, repeater devices 50 are disposed about the side lines, end lines, goal lines, or other portions of field 30. In some embodiments, the repeater devices 50 may be incorporated into other structures of field 30, such as, for example, a corner flag on a soccer field, a goal post, or a cross bar.

As noted above, object monitors 250 can operate as described for individual monitors 200, and can send data directly to base station 300 during a designated time slot when in range, or to another object monitor 250, repeater device 50, or individual monitor 200 if not in range of base station 300. In some embodiments, object monitor 250 does not communicate directly with base station 300, but transmits data to base station 300 only through one or more individual monitors 200 (or repeater devices 50). In other words, data gathered by object monitor 250 may be regularly transmitted to one or more individual monitors 200, which in turn transmits such data to base station 300 during a designated time slot, as described above.

The present invention has been described in the context of a base station and individual monitors for monitoring individuals participating in an athletic activity. The present invention can be applied to a variety of types of athletic and group monitoring systems, such as, for example, those disclosed in one or more of U.S. patent application Ser. No. 13/077,494, filed Mar. 31, 2011, titled "Group Performance Monitoring System and Method"; U.S. patent application Ser. No. 13/077,520, filed Mar. 31, 2011, titled "Sensor Garment"; U.S. patent application Ser. No. 13/077,510, filed Mar. 31, 2011, titled "Group Performance Monitoring System and Method"; U.S. patent application Ser. No. 13/446,937, filed Apr. 13, 2012, titled "Athletic Activity Monitoring Methods and Systems"; U.S. patent application Ser. No. 13/446,982, filed Apr. 13, 2012, titled "Sport Ball Athletic Activity Monitoring Methods and Systems"; U.S. patent application Ser. No. 13/446,986, filed Apr. 13, 2012, titled "Wearable Athletic Activity Monitoring Methods and Systems"; and U.S. patent application Ser. No. 13/543,428, filed Jul. 6, 2012, titled "Group Performance Monitoring System and Method", the disclosure of each of which is incorporated herein in its entirety by reference thereto.

Additionally, embodiments of the present invention can be applied in contexts and situations other than athletic monitoring. The present invention can apply to any network including a network coordinator and mobile network endpoints in communication. The dynamic nature of embodiments of the present invention facilitates monitoring of endpoints that change position relative to each other. Since each mobile endpoint can act as a repeater, data paths through such endpoints can change dynamically in order to optimize and ensure data transfer from endpoints to network coordinator. For example, the present invention can be applied to a communication network for monitoring troops in training or on a battlefield, a communication network for monitoring patients by medical personnel, and a communication network for monitoring inventory or other items.

The present invention has been described above by way of exemplary embodiments. Accordingly, the present invention should not be limited by any of the above-described exemplary embodiments, but should be defined only in accordance with the following claims and their equivalences.

What is claimed is:

1. A communication network for facilitating monitoring of an athletic activity, the network comprising:
    a base station;
    a first monitor configured to be coupled to a first individual; and
    a second monitor configured to be coupled to a second individual,
    wherein the base station is configured to transmit a first beacon message,
    wherein, in response to receipt of the first beacon message, the first monitor is configured to transmit an endpoint message including data relating to characteristics of the first individual,
    wherein the second monitor is configured to receive the endpoint message from the first monitor,
    wherein, in response to not receiving the endpoint message from the first monitor by a determined time, the base station is configured to transmit a second beacon message instructing the second monitor to transmit the endpoint message, and
    wherein, in response to receipt of the second beacon message, the second monitor is configured to transmit the endpoint message.

2. The communication network of claim 1, further comprising:
    a third monitor configured to be coupled to a third individual, wherein the third monitor is configured to receive the endpoint message from the second monitor,
    wherein, in response to not receiving the endpoint message from the second monitor by a determined time, the base station is configured to transmit a third beacon message instructing the third monitor to transmit the endpoint message,
    wherein, in response to receipt of the third beacon message, the third monitor is configured to transmit the endpoint message.

3. The communication network of claim 2, wherein the base station is configured to transmit the first beacon message during a beacon message timeslot of a first frame, to transmit the second beacon message during a beacon message timeslot of a second frame, and to transmit the third beacon message during a beacon message timeslot of a third frame,
    wherein the first monitor is configured to transmit the endpoint message during an endpoint message timeslot of the first frame, and
    wherein the second monitor is configured to transmit the endpoint message during a repeat message timeslot of the second frame.

4. The communication network of claim 3, wherein the repeat message timeslot of the second frame is assigned by the base station and communicated to the second monitor via the second beacon message.

5. The communication network of claim 3, wherein the third monitor is configured to transmit the endpoint message during a repeat message timeslot of the third frame.

6. The communication network of claim 5, wherein the repeat message timeslot of the third frame is assigned by the base station and communicated to the third monitor via the third beacon message.

7. A communication network for facilitating monitoring of an athletic activity, the communication network comprising:
    a base station; and
    a first monitor configured to be coupled to an individual,
    wherein the base station is configured to transmit a first beacon message,
    wherein, in response to receipt of the first beacon message, the first monitor is configured to transmit an endpoint message including a characteristic of the individual, and
    wherein the base station is configured to receive the endpoint message, and, if the base station does not receive the endpoint message by a determined time, the base station is configured to transmit a second beacon signal, the second beacon signal including instructions to a second monitor to transmit the endpoint message.

8. The communication network of claim 7, wherein the second monitor is configured to receive the endpoint message transmitted by the first monitor, and
    wherein, in response to receipt of the second beacon signal, the second monitor is configured to transmit the endpoint message.

9. The communication network of claim 7, wherein, in response to receipt of the first beacon signal, the first monitor is configured to transmit the endpoint message during a first timeslot of a first frame,
    wherein, in response to receipt of the second beacon signal, the second monitor is configured to transmit the endpoint message during a second timeslot of a second frame.

10. The communication network of claim 9, wherein the first timeslot is an endpoint message timeslot, and wherein the second timeslot is a repeat message timeslot.

11. The communication network of claim 9, wherein the second timeslot is assigned by the base station if the base station does not receive the endpoint message during the first frame.

12. The communication network of claim 7, wherein the first and second monitors are portable with respect to the base station.

13. The communication network of claim 7, wherein the first monitor includes a sensor for sensing a characteristic of the individual.

14. A communication network for facilitating monitoring of an athletic activity, the communication network comprising:
    a base station;
    a first monitor configured to be coupled to a first individual; and
    a second monitor configured to be coupled to a second individual,
    wherein the base station is configured to transmit a first beacon signal during a first frame,
    wherein, in response to receipt of the first beacon signal, the first monitor is configured to transmit first data representing first characteristics of the first individual during the first frame,
    wherein, in response to receipt of the first beacon signal, the second monitor is configured to transmit second data representing second characteristics of the second individual during the first frame, wherein the first monitor is configured to receive the second data, wherein the base station is configured to receive the first data and the second data during the first frame, and, if the base station does not receive the second data during the first frame, the base station is configured to transmit a second beacon signal during a second frame, the second beacon signal including instructions to the first monitor to transmit the second data during the second frame, and wherein, in response to receipt of the second beacon signal, the first monitor is configured to transmit the second data during the second frame.

15. The communication network of claim 14, wherein the first monitor is configured to transmit the first data during an assigned first timeslot of the first frame, wherein the second monitor is configured to transmit the second data during an assigned second timeslot of the first frame, and wherein the first monitor is configured to transmit the second data during an assigned third timeslot during the second frame.

16. The communication network of claim 15, wherein the first and second timeslots are timeslots reserved for initial data transmissions, and wherein the third timeslot is a timeslot reserved for repeat data transmissions.

17. The communication network of claim 14, wherein, in response to receipt of the second data, the first monitor is configured to transmit an indication that the first monitor has received the second data.

18. The communication network of claim 17, wherein the first monitor is configured to transmit the indication during a third frame, and wherein the third frame occurs after the first frame and before the second frame.

19. The communication network of claim 17, wherein the base station selects the first monitor to instruct to transmit the second data during the second frame in response to receipt of the indication that the first monitor has received the second data.

20. A method for monitoring athletic activity, the method comprising:

transmitting, via a base station, a first beacon message;

transmitting, via a first monitor in response to receipt of the first beacon message by the first monitor, an endpoint message including data indicative of a characteristic of an individual;

storing the endpoint message at the base station, if the endpoint message transmitted by the first monitor is received by the base station;

receiving, at a second monitor, the endpoint message transmitted by the first monitor;

transmitting, via the base station, a second beacon message, including instructions for the second monitor to transmit the endpoint message, if the endpoint message transmitted by the first monitor is not received by the base station by a determined time;

transmitting, via the second monitor in response to receipt of the second beacon message, the endpoint message; and storing the endpoint message at the base station, if the endpoint message transmitted by the second monitor is received by the base station.

21. The method of claim 20, further comprising:

receiving, at a third monitor, the endpoint message transmitted by the second monitor;

transmitting, via the base station, a third beacon message, including instructions for the third monitor to transmit the endpoint message, if the endpoint message transmitted by the second monitor is not received by the base station by a determined time;

transmitting, via the third monitor in response to receipt of the third beacon message, the endpoint message; and storing the endpoint message at the base station, if the endpoint message transmitted by the third monitor is received by the base station.

* * * * *